(12) United States Patent
Roberson (10) Patent No.: US 10,069,329 B1
(45) Date of Patent: Sep. 4, 2018

(54) SOLAR RECHARGEABLE MULTIFUNCTIONAL AND TRANSFERABLE VISUAL OR AUDIO SAFETY DISPLAY BEACON DEVICE

(71) Applicant: Jabutarik Benjamin Roberson, Hawthorne, CA (US)

(72) Inventor: Jabutarik Benjamin Roberson, Hawthorne, CA (US)

(73) Assignee: Jabutarik Benjamin Roberson

( * ) Notice: Subject to any disclaimer, the term of this patent is extended or adjusted under 35 U.S.C. 154(b) by 0 days.

(21) Appl. No.: 15/854,564

(22) Filed: Dec. 26, 2017

Related U.S. Application Data (63) Continuation-in-part of application No. 14/658,703, filed on Mar. 16, 2015, now Pat. No. 9,903,545.

(51) Int. Cl.
| | |
|---|---|
| *H02J 7/35* | (2006.01) |
| *G02F 1/133* | (2006.01) |
| *G02F 1/1333* | (2006.01) |
| *H02S 40/32* | (2014.01) |
| *G08B 7/06* | (2006.01) |
| *H02S 40/38* | (2014.01) |
| *H02S 99/00* | (2014.01) |

(52) U.S. Cl.
CPC .......... *H02J 7/355* (2013.01); *G02F 1/13306* (2013.01); *G02F 1/13338* (2013.01); *G08B 7/06* (2013.01); *H02S 40/32* (2014.12); *H02S 40/38* (2014.12); *G02F 2001/13324* (2013.01); *H02S 99/00* (2013.01)

(58) Field of Classification Search
CPC ......... F21L 4/08; F21V 21/0965; H02J 7/355; H02S 40/32; H02S 40/38; H02S 9/00; G08B 7/06; G02F 2001/13324
See application file for complete search history.

(56) References Cited

U.S. PATENT DOCUMENTS

| | | | | |
|---|---|---|---|---|
| 5,008,864 A * | 4/1991 | Yoshitake | ............ | G04B 47/025 368/10 |
| 6,266,685 B1 * | 7/2001 | Danielson | ............. | G06F 1/1626 708/141 |
| 6,619,835 B2 * | 9/2003 | Kita | ..................... | A44C 5/0015 368/10 |
| 7,529,155 B2 * | 5/2009 | Fasciano | ............. | G04G 9/0076 368/10 |
| 9,004,329 B2 * | 4/2015 | Hsieh | ..................... | G04G 17/08 224/169 |
| 2009/0231960 A1 * | 9/2009 | Hutcheson | ............. | G04G 17/04 368/10 |
| 2009/0284216 A1 * | 11/2009 | Bessa | .................... | H02J 7/0044 320/101 |
| 2011/0194886 A1 * | 8/2011 | Wu | ....................... | E06B 3/9641 403/23 |
| 2012/0168471 A1 * | 7/2012 | Wilson | ..................... | A45F 5/00 224/152 |
| 2012/0194976 A1 * | 8/2012 | Golko | ..................... | G06F 1/163 361/679.01 |
| 2012/0211626 A1 * | 8/2012 | Zhu | ........................... | A45F 5/00 248/316.1 |

* cited by examiner

*Primary Examiner* — Paul Lee (57) ABSTRACT

A solar rechargeable safety beacon device is disclosed. The solar rechargeable safety beacon device is a multifunctional device that can be shared between individuals as well as domestic pets and surfaces.

10 Claims, 9 Drawing Sheets

SOLAR RECHARGEABLE MULTIFUNCTIONAL AND TRANSFERABLE VISUAL OR AUDIO SAFETY DISPLAY BEACON DEVICE

CLAIM OF BENEFIT TO PRIOR APPLICATION

This application is a continuation-in-part (CIP) application of and claims benefit to U.S. Non-Provisional patent application Ser. No. 14/658,703, entitled "SOLAR RECHARGEABLE MULTIFUNCTIONAL AND TRANSFERABLE VISUAL OR AUDIO SAFETY DISPLAY BEACON DEVICE," filed Mar. 16, 2015, and the U.S. Non-Provisional patent application Ser. No. 14/658,703 had previously claimed benefit to U.S. Provisional Patent Application 61/928,946, entitled "VISUAL SAFETY BEACON UNIT," filed Jan. 17, 2014, in connection with a petition to restore priority to the Provisional Patent Application 61/928,946 pursuant to 37 C.F.R. § 1.78(b), which was granted on Dec. 11, 2015. The U.S. Non-Provisional patent application Ser. No. 14/658,703 is incorporated herein by reference.

BACKGROUND

Embodiments of the invention described in this specification relate generally to visual indicators, and more particularly, to solar rechargeable transferable visual indicators.

Individuals can be difficult to see in the dark, especially in stormy weather, wilderness settings, at sea, and in many other cases. Current devices provide only a visual indicator and are limited to being worn by an individual. They cannot be moved or transferred between individuals, and they cannot be placed on surfaces, animals, and so on. Current devices also fail to use a renewable energy source that is integrated with or attached to the device to self-recharge, such as a solar recharger.

Therefore, what is needed is a visual and audio safety indicator that can be transferred between people or otherwise placed somewhere to provide a visual and/or an audio indication, and which includes a solar recharger and secondary power source for other devices and/or electronics.

BRIEF DESCRIPTION

Some embodiments of the invention include a novel solar rechargeable multifunctional visual and audio safety display beacon device that is transferable from a person to other people or positionable at some other location. According to one embodiment, the visual and audio safety display beacon device increases the visibility and awareness of an individual or location during darkness or other adverse viewing conditions and is configured to be transferred between carriers and includes multiple modes of activation, such as solar recharging of the safety beacon device, or plugging a universal serial bus (USB) cable adapter into a power outlet and into a USB port on the safety beacon device. The device includes a base plate, a screen, a fastener, and a quick release thumb tab. The base plate includes a compartment configured to hold an inverter configured with a plurality of activation functions, such as a secondary power source device or solar charger device for other prefabricated electronics and devices. The screen is connected to the base plate and configured to be powered by the inverter. The fastener is configured to removably attach the device to a substrate or surface. The quick release thumb tab is connected to the base plate and is optionally configured to wrap around the inverter when it is placed in the compartment. The thumb tab includes a first tab configured to remove an optional compartment door and a second thumb tab configured to remove the device from the surface or substrate.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel solar rechargeable multifunctional visual and audio safety display beacon device that is transferable from a person to other people or positionable at some other location. According to one embodiment, the visual and audio safety display beacon device increases the visibility and awareness of an individual or location during darkness or other adverse viewing conditions and is configured to be transferred between carriers and includes multiple modes of activation, such as solar recharging of the safety beacon device, or plugging a universal serial bus (USB) cable adapter into a power outlet and into a USB port on the safety beacon device. The device includes a base plate, a screen, a fastener, and a quick release thumb tab. The base plate includes a compartment configured to hold an inverter configured with a plurality of activation functions, such as a secondary power source device or solar charger device for other prefabricated electronics and devices. The screen is connected to the base plate and configured to be powered by the inverter. The fastener is configured to removably attach the device to a substrate or surface. The quick release thumb tab is connected to the base plate and is optionally configured to wrap around the inverter when it is placed in the compartment. The thumb tab includes a first tab configured to remove an optional compartment door and a second thumb tab configured to remove the device from the surface or substrate.

As stated above, individuals can be difficult to see in the dark, especially in stormy weather, wilderness settings, at sea, and in many other cases, but the existing devices provide only a visual indicator and are limited to being worn by an individual instead of being able to be moved or transferred between individuals, placed on surfaces, animals, or being self-rechargeable by a renewable and abundant energy source, such as solar energy, and by other secondary power sources, and being able to recharge other prefabricated electronic devices, and so on.

Embodiments of the invention described in this specification solve such problems by a solar rechargeable multifunctional visual and audio safety display beacon device that mounts and dismounts from a landing pad body strap and utility tote. The visual and audio safety beacon device provides a visual and audio safety indicator and can be shared between individuals as well as domestic pets and surfaces.

Several more detailed embodiments of the safety beacon device are described below. Section I describes examples of a multifunctional safety beacon device and a transferable landing pad. Section II describes examples of a solar rechargeable safety beacon device.

I. Multifunctional Safety Beacon

Figure 1:
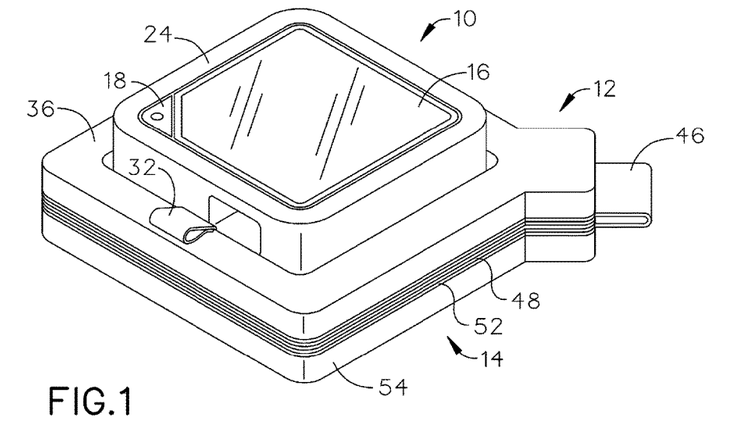
FIG. 1 conceptually illustrates a perspective view of a multifunctional safety beacon device in a transferable landing pad in some embodiments.

By way of example, FIG. 1 conceptually illustrates a perspective view of a multifunctional safety beacon device 10 in a pair of transferable landing pads including an upper landing pad 12 and a lower landing pad 14. As shown in this figure, the transferable landing pads 12 and 14 may be separably connected by a connector tab 46. When the connector tab 46 is closed, the transferable landing pads 12 and 14 may be form a compartment to hold the beacon device 10. The beacon device 10 may include a screen 16, a corner inverter unit 18, an outer housing 24, and a thumb tab 32. The upper landing pad 12 may include an upper pad 36, which may include one or more closed cell foam materials, such as, e.g., silicon rubber, poly plastic, neoprene foam, or the like. The lower landing pad 14 may include a lower pad 54. The transferable landing pads 12 and 14 may also include landing pad plates, such as upper landing pad plate 48 and lower landing pad plate 52.

Figure 2:
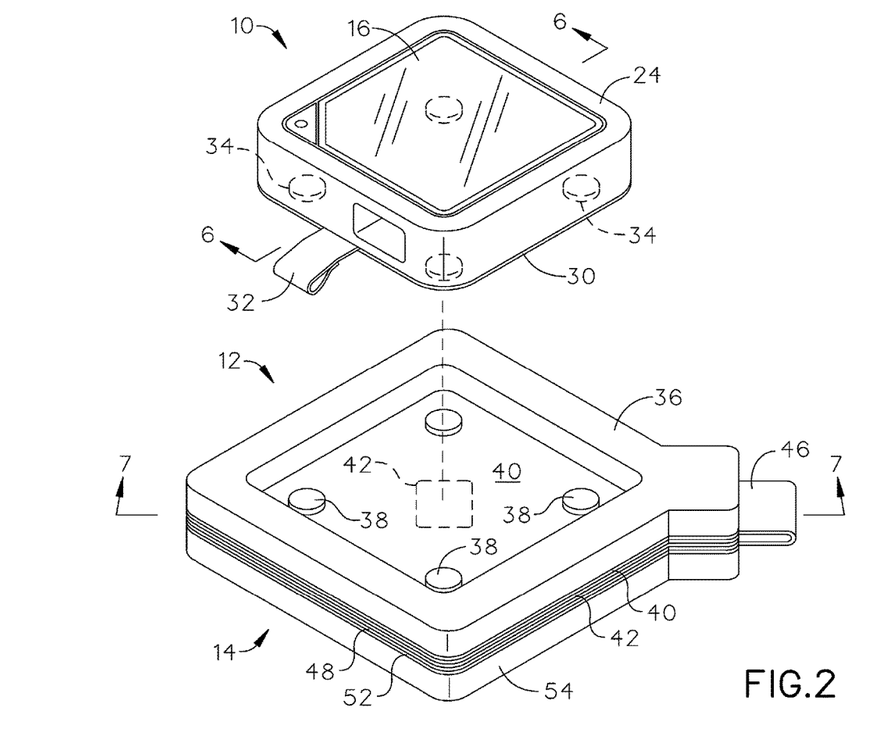
FIG. 2 conceptually illustrates a cutaway perspective view of the multifunctional safety beacon device during placement in a landing pad compartment in some embodiments.

Referring to FIG. 2, which conceptually illustrates a cutaway perspective view of the multifunctional safety beacon device 10 during placement in a landing pad compartment, in some configurations, the transferable landing pads 12 and 14 may include additional plates, such as upper landing pad plate 40 and lower landing pad plate 44. The multifunctional safety beacon device 10 shown in FIG. 2 is further described by reference to FIG. 6, below, and the transferable landing pads 12 and 14 are further described by reference to FIG. 7, below. In some of these configurations, all four landing pad plates are used, such that upper landing pad plate 40 is a first landing pad plate 40, lower landing pad plate 44 is a second landing pad plate 44, upper landing pad plate 48 is a third landing pad plate 48, and lower landing pad plate 52 is a fourth landing pad plate 52. As shown in FIG. 2, the upper landing pad 12 may include upper landing pad fasteners 38 on the first landing pad plate 40. A corresponding set of beacon unit fasteners 34 may be included along a backing plate 30 under the beacon device 10 (i.e., opposite the screen 16). Alternatively, or in conjunction with the upper landing pad fasteners 38 and the beacon unit fasteners 34, the backing plate 30 may include an upper magnet 42 that magnetically connects the beacon device 10 to the first landing pad plate 40.

Figures 5, 6:
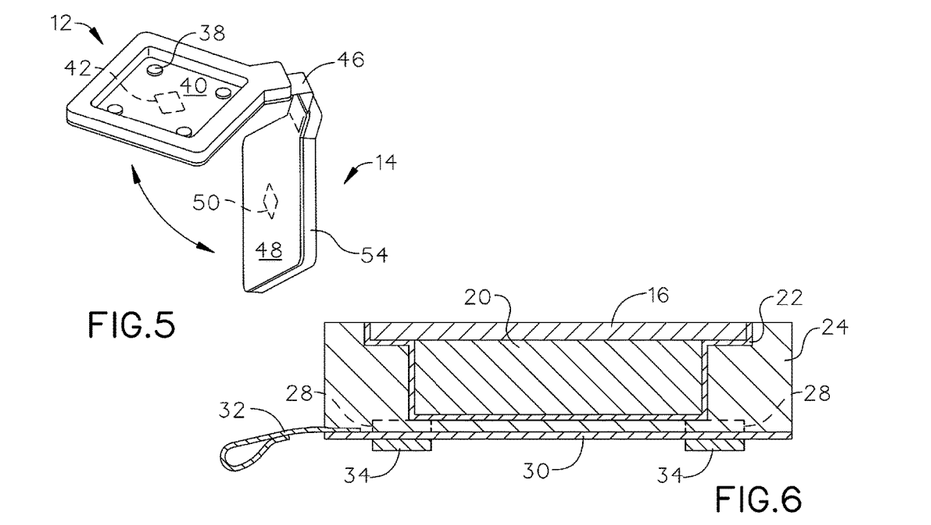
FIG. 5 conceptually illustrates a perspective view of the beacon unit compartment being separated between upper and lower landing pads in some embodiments.
FIG. 6 conceptually illustrates a section view of the multifunctional safety beacon device in some embodiments taken along line 6-6 in FIG. 2.
Figure 7:
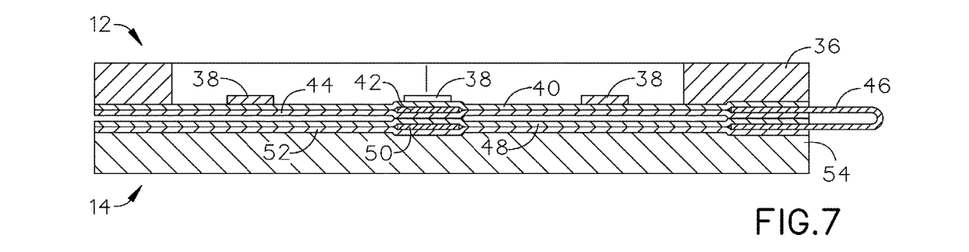
FIG. 7 conceptually illustrates a section view of the multifunctional safety beacon device in some embodiments taken along line 7-7 in FIG. 2.

Referring now to FIGS. 6 and 7, sectional views are shown which further describe features of the multifunctional safety beacon device 10 and the compartment formed by the landing pads 12 and 14. Specifically, FIG. 6 conceptually illustrates a section view of the multifunctional safety beacon device 10 taken along line 6-6 in FIG. 2. As shown in this figure, the multifunctional safety beacon device 10 includes the screen 16, the electronics and device module 20, the magnets 28, the tethering quick release thumb tab 32, the backing plate 30, and the beacon unit fasteners 34, all of which together specify configuration of the inner housing 22 and the outer housing 24.

Similarly, FIG. 7 conceptually illustrates a section view of the compartment formed by the upper and lower landing pads 12 and 14 of the multifunctional safety beacon device 10 taken along line 7-7 in FIG. 2. As shown in this figure, the upper landing pad 12 includes the cavity for the compartment into which the beacon device 10 is placed. Once in place, the beacon unit fasteners 34 of the beacon device 10 connect to the upper landing pad fasteners 38 which are bonded to or otherwise fastened to the first landing pad plate 40. Under the first landing pad plate 40 is the upper magnet 42 and the second landing pad plate 44. The upper magnet 42 secures the upper landing pad 12 to the lower landing pad 14 by connection to lower magnet 50. Above the lower magnet 50 is the third landing pad plate 48, and then the fourth landing pad plate 52. The interior upper pad 36 and lower pad 54 of the upper and lower landing pads 12 and 14 may include neoprene or another suitable material. The upper and lower landing pads 12 and 14 are connected together by connector tab 46. In some embodiments, the beacon device 10 and compartment can be fastened to a movable or stationary object or thing.

Figures 3, 4:
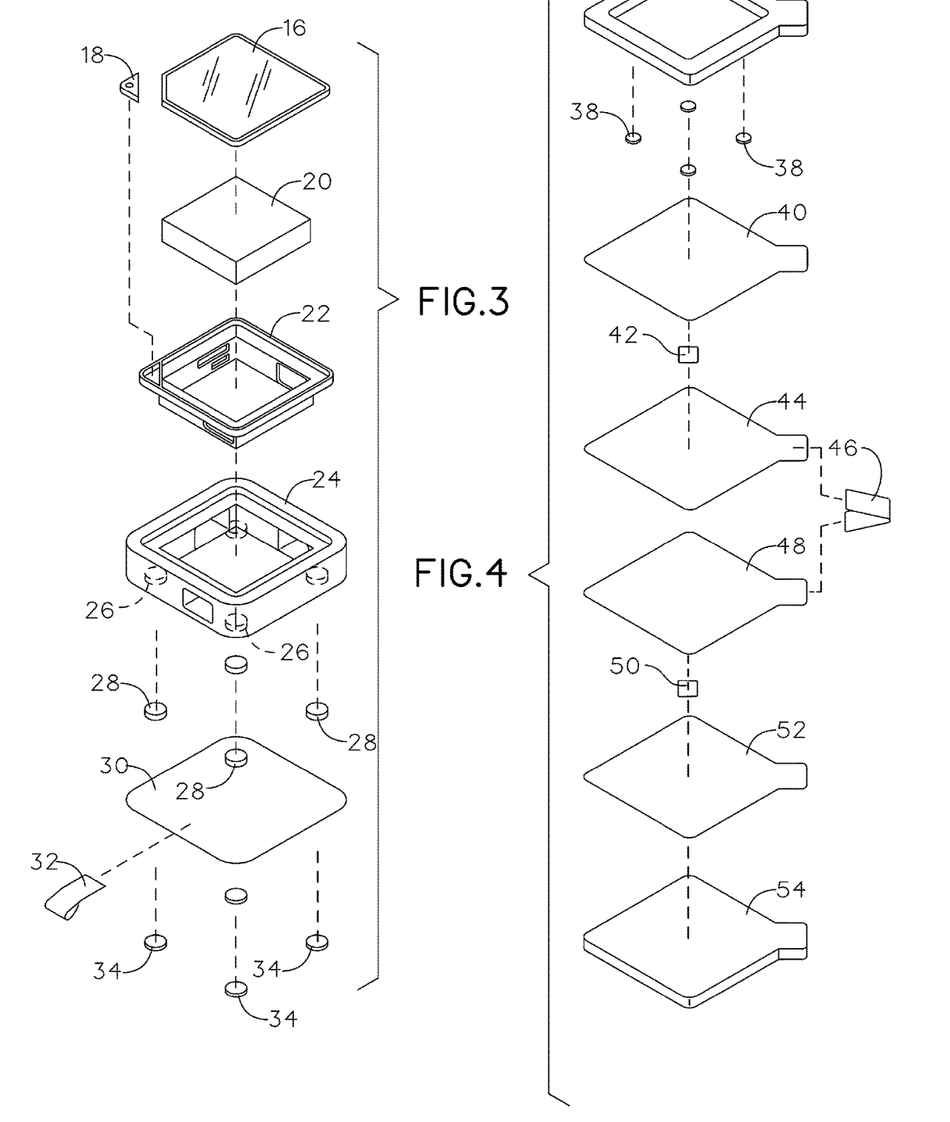
FIG. 3 conceptually illustrates an exploded view of the visual safety beacon device in some embodiments.
FIG. 4 conceptually illustrates an exploded view of the beacon unit compartment in which the visual safety beacon device of some embodiments is placed.

Now referring to FIGS. 3 and 4, which conceptually illustrates exploded views of the multifunctional safety beacon device 10 and the compartment formed by the transferable landing pads 12 and 14, the beacon device 10, as shown in FIG. 3, includes the screen 16, the corner inverter unit 18, an electronics and device module 20, an inverter housing unit 22, the outer housing 24, a set of magnet recesses 26 and a set of magnets 28 that are permanently attached to and concealed between the backing plate 30 and the bottom side of the beacon device 10, and a tethering quick release thumb tab 32. The screen 16 may include a light-emitting diode (LED) screen, an organic light-emitting diode (OLED) screen, a liquid crystal display (LCD) screen or touchscreen, or a dot matrix screen. The screen 16 may be configured to display the LEDs outward, or otherwise configure the display side of the screen 16 outward. One or more of the magnets may be bonded to a proximate plate. One or more of the configured display screens may be bonded to the inverter housing unit 22. The outer housing unit 24 may fit into the compartment formed by the upper and lower landing pads 12 and 14 and may be retained by one or more magnets 28 or fasteners, which may include, e.g., hook-and-loop fasteners, snaps, buckles, Velcro®, or the like. The shape and size of the backing plate 30 may influence or determine the appropriate storage compartment size. A compartment door and access port 23 may serve to retain or access the inverter housing unit 22 in the compartment. The compartment formed by the upper and lower landing pads 12 and 14 may vary in size and shape to accommodate the inverter housing unit 22 and/or other electronics and devices options stored inside, such as electronics and device module 20.

The tethering quick release thumb tab 32 may connect to the backing plate 30 through the compartment door 23. The thumb tab 32 may be made from nylon or any other suitable material or combination of materials. In some embodiments, the beacon device 10 includes a plurality of tethering quick release thumb tabs 32 that connect to the backing plate 30 through each of a plurality of compartment doors 23. In some embodiments, each thumb tab 32 may be connected to the backing plate 30 in a different manner. For instance, a first tab 32 may be attached to the backing plate 30 through a compartment door 23 with sewing, epoxy, etc., thereby allowing easy access to the compartment and the inverter housing unit 22, while a second tab 30 may be permanently bonded to the backing plate 30, in order to facilitate detaching or removing the beacon device 10 from a surface or article to which it is attached.

As shown in FIG. 4, the compartment formed by the transferable landing pads 12 and 14 includes the upper pad 36, a set of upper pad fasteners 38, the first landing pad plate 40, the upper magnet 42, the second landing pad plate 44, the connector tab 46, the third landing pad plate 48, a lower magnet 50, the fourth landing pad plate 52, and the lower pad 54.

The safety beacon device 10 may be activated by one or more independent functions. For example, the corner inverter unit 18 may include three independent, self-contained inverter functions: sound, Wi-Fi, and ON/OFF button. Thus, the unit may be activated, for example, by sounds, Wi-Fi signal, and/or a switch. The screen 16 of the beacon device 10 may be fabricated into any shape and size. The corner inverter unit 18, in conjunction with the electronics and device module 20 may be recharged and powered by a conventional battery cell or a solar energy battery cell that is appropriate for the application at hand. For example, the corner inverter unit 18 and the electronics and device module 20 may be recharged also by a cable interface and wall plug outlet, etc. The corner inverter unit 18 may include a cable interface for connecting to the screen 16. The screen 16 may be bonded to the close cell foam outer housing 24, or the inverter housing unit 22 that together form a compartment and tether door access 23 cut out from the middle section to house the corner inverter unit 18.

In some embodiments, the safety beacon device 10 may be compatible with a separable beacon unit compartment. By way of example, FIG. 5 conceptually illustrates a perspective view of the beacon unit compartment being separated between upper and lower landing pads 12 and 14. As shown in this figure, the lower magnet 50 is positioned proximate to the third landing pad plate 48 of the lower landing pad 14, while the upper magnet 42 is positioned proximate to the second landing pad plate 44 (not shown), which is adjacent to and underneath the first landing pad plate 40 of the upper landing pad 12. The curved arrow indicates that the upper and lower landing pads 12 and 14 can be separated and re-connected by flexing the connector tab 46 into an open configuration (as shown) and a closed configuration (when the upper and lower landing pads 12 and 14 are connected by upper and lower magnets 42 and 50).

Figure 8:
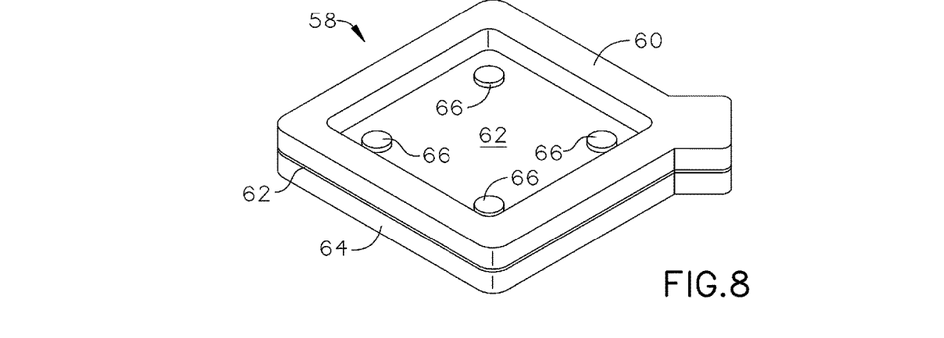
FIG. 8 conceptually illustrates a perspective view of a second type of beacon unit compartment in some embodiments.

In some embodiments, the transferable landing pad compartment formed by the upper and lower landing pads 12 does not include a connector tab 46, as described by reference to FIGS. 2 and 7. In some embodiments, the compartment is a singular unit. By way of example, FIG. 8 conceptually illustrates a perspective view of a second type of beacon unit compartment that demonstrates a singular landing pad compartment unit 58 for holding a multifunctional safety beacon device 10 of some embodiments. As shown in this figure, the singular landing pad compartment unit 58 includes an upper landing pad 60, a middle plate 62, a lower landing pad 64, and a set of fasteners 66, which may include hook-and-loop fasteners, snaps, buckles, Velcro®, and/or magnets, etc.

Figures 9, 10:
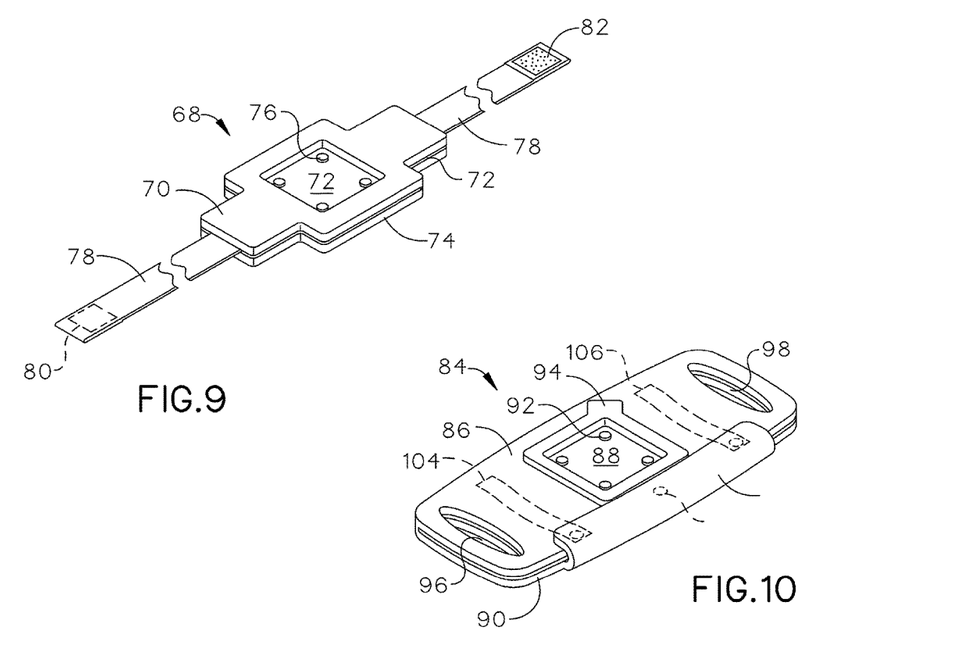
FIG. 9 conceptually illustrates a perspective view of a third type of beacon unit compartment with an integral strap in some embodiments.
FIG. 10 conceptually illustrates a perspective view of a fourth type of beacon unit compartment in some embodiments.

The safety beacon device 10 of some embodiments is compatible with a landing pad compartment with an integral strap. By way of example, FIG. 9 conceptually illustrates a perspective view of a third type of beacon unit compartment 68 with an integral strap 78. The landing pad compartment 68 may include an upper pad 70, a middle plate 72, and a lower pad 74. The landing pad compartment 68 may include a set of fasteners 76, along with the strap 78, as well as a hooked strap fastener 80 and looped strap fastener 82. The strap 78 may be made of neoprene or another suitable material. The upper pad 70 may include a cutout suitably shaped to receive a safety beacon device 10. The fasteners 76 may include any suitable fastening device(s), such as, e.g., hook-and-loop fasteners, snaps, Velcro®, and so on, positioned to retain the beacon device 10 within the cutout area of the singular landing pad compartment 68. The strap 78 may be a reinforced elastic strap 78 which may be placed between the second layer upper pad 70 and the lower pad 74. The ends of the strap 78 may include one or more fasteners 80 and 82, such as, e.g., buckle, clasp, snaps, and so on. The lower pad 74 may include neoprene or another suitable material.

The safety beacon device 10 of some embodiments is compatible with a tote sleeve landing pad configuration. By way of example, FIG. 10 conceptually illustrates a perspective view of a fourth type of beacon unit compartment with a tote sleeve configuration. As shown in this figure, the beacon unit compartment of the landing pad 94 is positioned on a storage utility tote sleeve 84. The tote sleeve 84 may be made from a strong, weather-resistant material. For example, the tote sleeve 84 may include an upper pad 86, middle pad 88, and lower pad 90, which together are made from a sheet of neoprene and reinforced nylon fabric layered together, and both sheets may be sewn and permanently bonded. To form the tote sleeve 84, the combined sheet may be folded in half with a protruding flap 100. The flap 100 and tote sleeve 84 may include, for example, loop fasteners 104 and 106 or a water proof zipper (not shown) that is used as a door access to a storage compartment. The tote sleeve 84 may include one or more reinforced holes, such as strap holes 96 and 98, which may receive a belt, strap, or other accessory.

Figure 11:
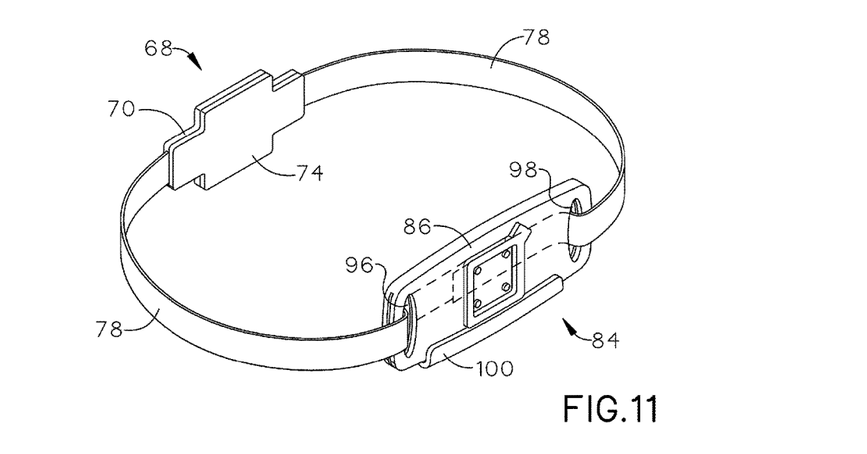
FIG. 11 conceptually illustrates a perspective view of the third and fourth types of beacon unit compartments connected by a strap in some embodiments.

In some embodiments, the strap may hold the tote sleeve 84 in a manner that may permit mounting a landing pad, such as, e.g., safety beacon landing pad 94 or landing pad 68. By way of example, FIG. 11 conceptually illustrates a perspective view of the two types of beacon unit compartments with different configurations being connected by a strap 78. As shown in this figure, the strap 78 of the landing pad 68 may thread through the holes 96 and 98 of the storage utility tote sleeve 84 with landing pad 94 facing outward from upper pad 86 in order to provide an added storage and/or multifunctional safety beacon device 10. The strap 78 is enclosed in a circle or oval such that beacon unit compartment 68 is opposite the tote sleeve 84 in connection with the strap 78. Thus, a user of the strap 78 is able to include multiple safety beacon devices 10 at one time.

Figures 12, 13, 14:
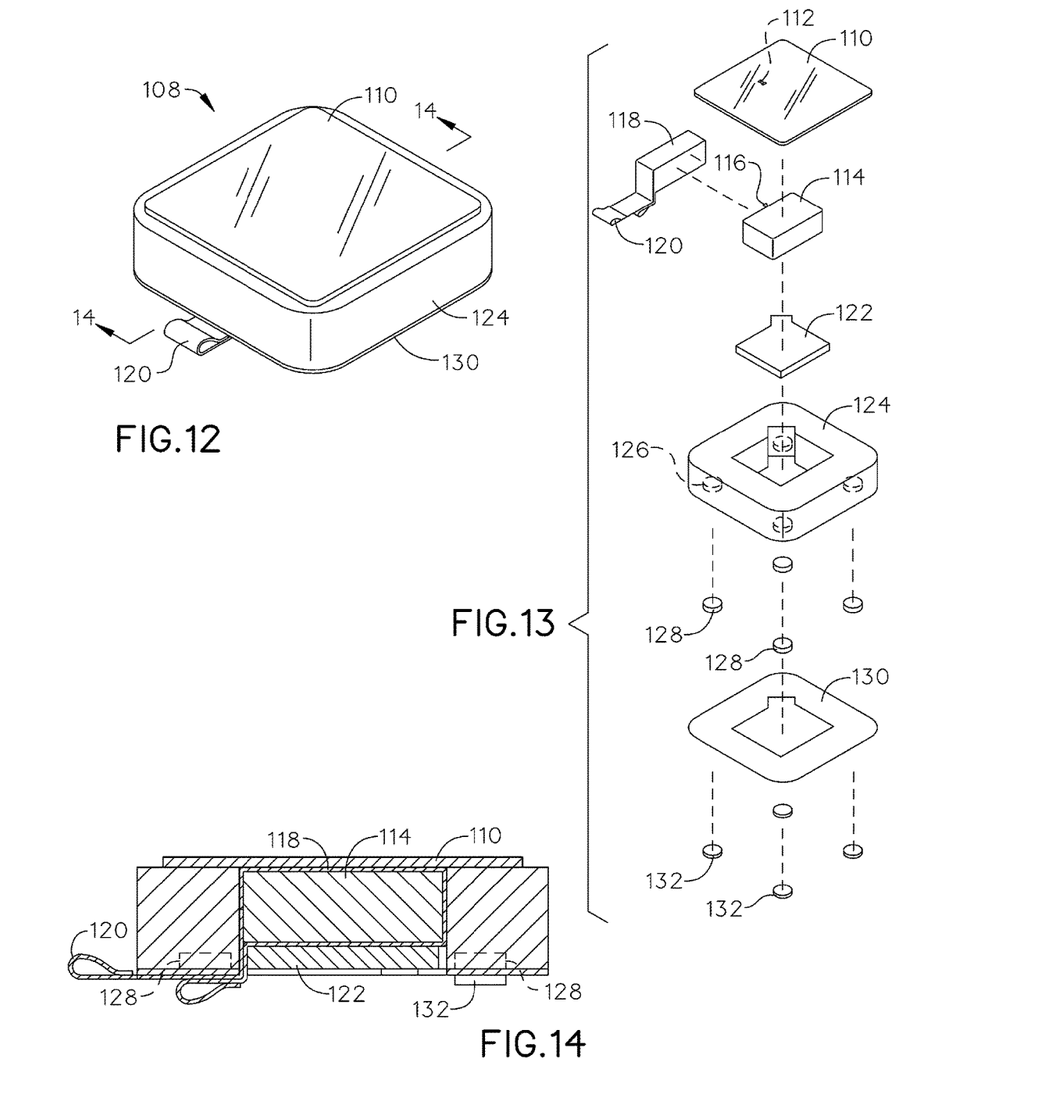
FIG. 12 conceptually illustrates a perspective view of another multifunctional safety beacon device in some embodiments.
FIG. 13 conceptually illustrates an exploded view of the multifunctional safety beacon device shown in FIG. 12.
FIG. 14 conceptually illustrates a section view of the multifunctional safety beacon device taken along line 14-14 in FIG. 12.

Additional configurations for beacon devices are possible for many different beacon unit compartments. For example, FIG. 12 conceptually illustrates a perspective view of another multifunctional safety beacon device 108. As shown in this figure, the safety beacon device 108 includes a screen 110, a compartment pad 124, and a lower plate 130, along with a tethered quick release thumb tab 120. FIG. 13 conceptually illustrates an exploded view of the multifunctional safety beacon device 108 shown in FIG. 12. In this figure, the beacon device 108 is shown with the screen 110, a screen plug 112, a battery pack 114, a pack plug 116, an inverter 118, the tethered quick release thumb tab 120, a lower compartment door plate 122, the compartment pad 124, a set of magnet recesses 126, a set of magnets 128, the lower plate 130, and a set of fasteners 132. In another view, FIG. 14 conceptually illustrates a section view of the multifunctional safety beacon device 108 taken along line 14-14 in FIG. 12. While the components are similarly configured as described by reference to FIGS. 3 and 13, in some embodiments, the multifunctional safety beacon device 108 includes other features and functions. For example, the electronics and device module 20 may be an all-in-one inverter unit 118. The all-in-one inverter unit 118 may include, e.g., a solar panel (not shown in this figure), the battery pack 114 (e.g., rechargeable battery), a short format audio or video recorder and playback unit (not shown), a panic sound button (not shown), and/or a universal serial bus (USB) connection port (not shown). One or more of these functions may allow the all-in-one inverter 118 to act as a primary or secondary power source for other electronics, devices, or the like.

II. Solar Rechargeable Safety Beacon Device

In some embodiments, the safety beacon device is powered by a solar rechargeable battery pack. In some embodiments, the safety beacon device includes a solar panel that charges the solar rechargeable battery pack.

Figures 15, 16, 17:
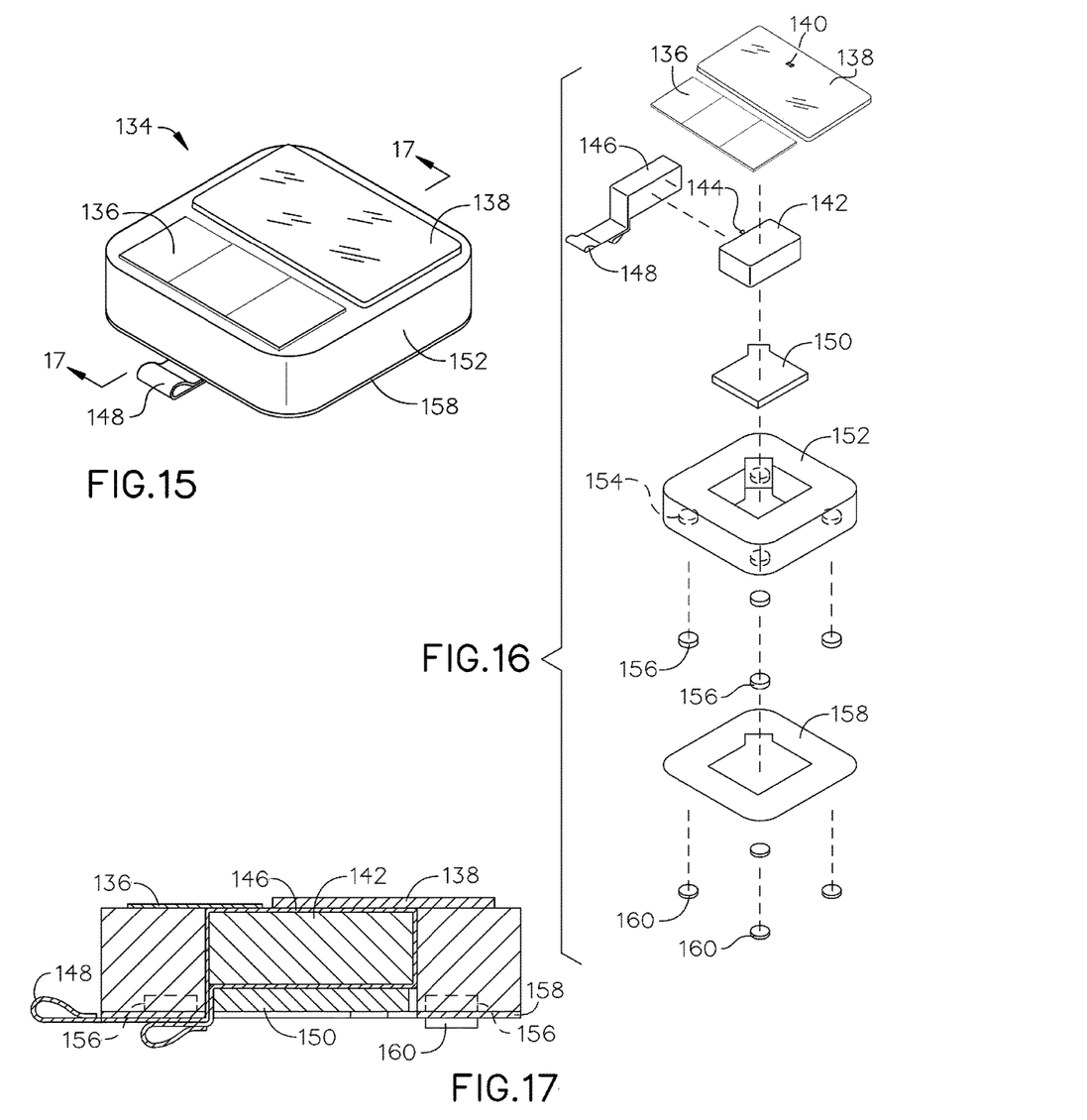
FIG. 15 conceptually illustrates a perspective view of a solar rechargeable safety beacon device in some embodiments.
FIG. 16 conceptually illustrates an exploded view of the solar rechargeable safety beacon device shown in FIG. 15.
FIG. 17 conceptually illustrates a section view of the solar rechargeable safety beacon device taken along line 17-17 in FIG. 15.

By way of example, FIG. 15 conceptually illustrates a perspective view of a solar rechargeable safety beacon device 134. As shown in this figure, the solar rechargeable safety beacon device 134 includes a solar panel 136, a screen 138, a compartment pad 152, and a lower plate 158, along with a tethered quick release thumb tab 148.

Turning to another view with more details about solar rechargeable safety beacon device 134, FIG. 16 conceptually illustrates an exploded view of the solar rechargeable safety beacon device 134 shown in FIG. 15. In this figure, the solar rechargeable safety beacon device 134 is shown with the screen 138, a screen plug 140, a solar rechargeable battery pack 142, a solar rechargeable battery pack plug 144, an inverter 146, the tethered quick release thumb tab 148, a lower compartment door plate 150, the compartment pad 152, a set of magnet recesses 154, a set of magnets 156, the lower plate 158, and a set of fasteners 160.

In another view, FIG. 17 conceptually illustrates a section view of the solar rechargeable safety beacon device 134 taken along line 17-17 in FIG. 15. The components of the solar rechargeable safety beacon device 134 shown in this figure are similar to the components of the multifunctional safety beacon device 108 described above by reference to FIG. 14., with a noted exceptions of the solar panel 136 (absent from the multifunctional safety beacon device 108 shown in FIGS. 12-14) and the screen 138 (being smaller in FIGS. 15-17 than the screen shown in FIGS. 12-14).

The example views of the solar rechargeable safety beacon device 134 described above by reference to FIGS. 15-17 demonstrate mobility features in the manner of power which can be supplied naturally from existing light that is captured by the solar panels and converted to stored battery power. The solar rechargeable safety beacon device 134 can also be used in conjunction with a landing pad, such as the transferable upper landing pad 12 and lower landing pad 14 described by reference to FIG. 1 above, the singular landing pad compartment unit 58 described above by reference to FIG. 8, the landing pad compartment with an integral strap described above by reference to FIG. 9, and the tote sleeve landing pad configuration described above by reference to FIG. 10.

Figure 18:
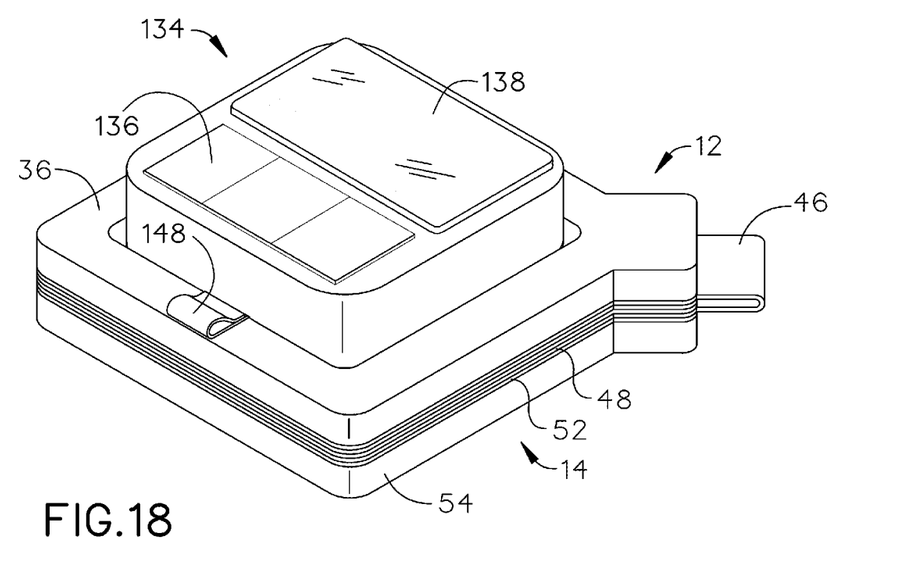
FIG. 18 conceptually illustrates a perspective view of a solar rechargeable safety beacon device in a transferable landing pad in some embodiments.

Thus, by way of example, FIG. 18 conceptually illustrates a perspective view of the solar rechargeable safety beacon device 134 in a transferable landing pad. The transferable landing pad shown in this figure is similar to the transferable landing pad with an upper landing pad 12 and a lower landing pad 14 described above by reference FIG. 1. As person of ordinary skill in the relevant art would appreciate that the solar rechargeable safety beacon device 134 could alternatively be used in conjunction with another type of landing pad configuration, such as the singular landing pad compartment unit 58 described above by reference to FIG. 8, the landing pad compartment with an integral strap described above by reference to FIG. 9, and the tote sleeve landing pad configuration described above by reference to FIG. 10.

In some embodiments, the solar rechargeable safety beacon device is made to attach directly to a person or an object without the need for a landing pad. As such, the solar rechargeable safety beacon device of these embodiments is freely attachable.

Figure 19:
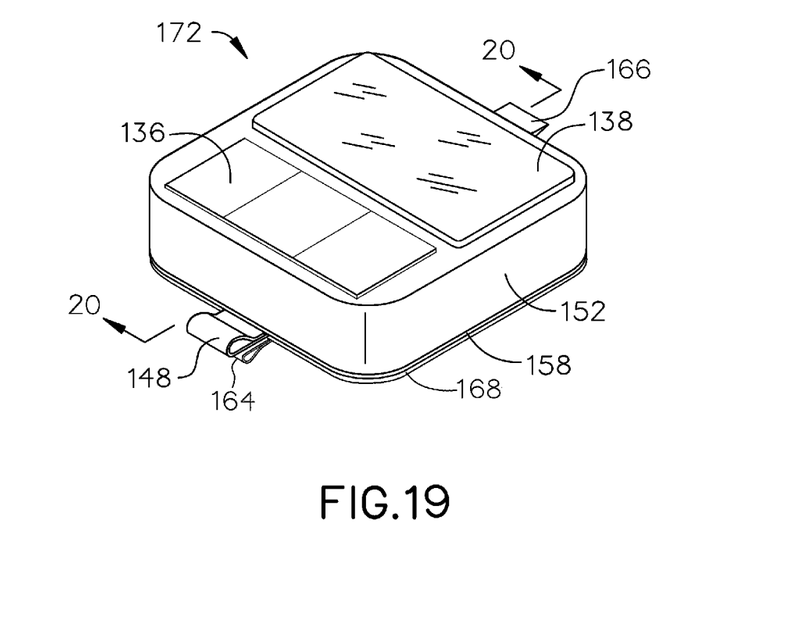
FIG. 19 conceptually illustrates a perspective view of a freely attachable solar rechargeable safety beacon device in some embodiments which can be attached to a person or an item without a landing pad.

By way of example, FIG. 19 conceptually illustrates a perspective view of a freely attachable solar rechargeable safety beacon device 172 that can be attached to a person or item without a landing pad. As shown in this figure, the freely attachable solar rechargeable safety beacon device 172 includes a solar panel 136, a screen 138, a compartment pad 152, a top lower plate 158, a middle lower plate 162, metal washers 160, a bottom lower plate 168, hook and loop fasteners 170, a top tethered quick release thumb tab 148, a bottom tethered quick release thumb tab 164, and a connector tab 166.

Specifically, the connector tab 166 is attached to the top lower plate 158 and the middle lower plate 162, with the bottom tethered quick release thumb tab 164 allowing for separation between the top lower plate 158 and the middle lower plate 162. When the top lower plate 158 and the middle lower plate 162 are separated into an open configuration, the connector tab 166 operates as a hinge. The metal washers 160 are permanently attached to an underside of the middle lower plate 162 and concealed between the top lower plate 158 and the middle lower plate 162 when the top lower plate 158 and the middle lower plate 162 are in a closed configuration. However, the metal washers 160 are exposed along the under side of the middle lower plate 162 when the top lower plate 158 and the middle lower plate 162 are in the closed configuration. The hook and loop fasteners 170 are permanently attached to a bottom surface of the bottom lower plate 168, allowing the freely attachable solar rechargeable safety beacon device 172 to be attached to a person or object.

Figure 20:
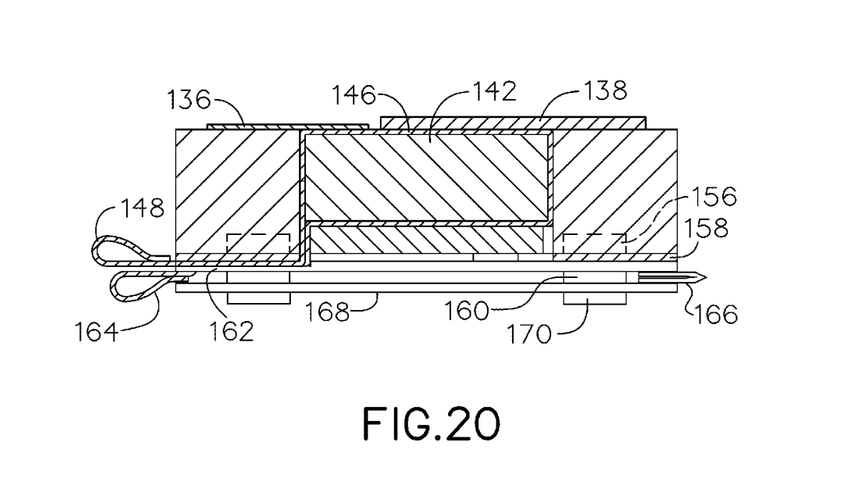
FIG. 20 conceptually illustrates a section view of the freely attachable solar rechargeable safety beacon device taken along line 20-20 in FIG. 19.
Figure 21:
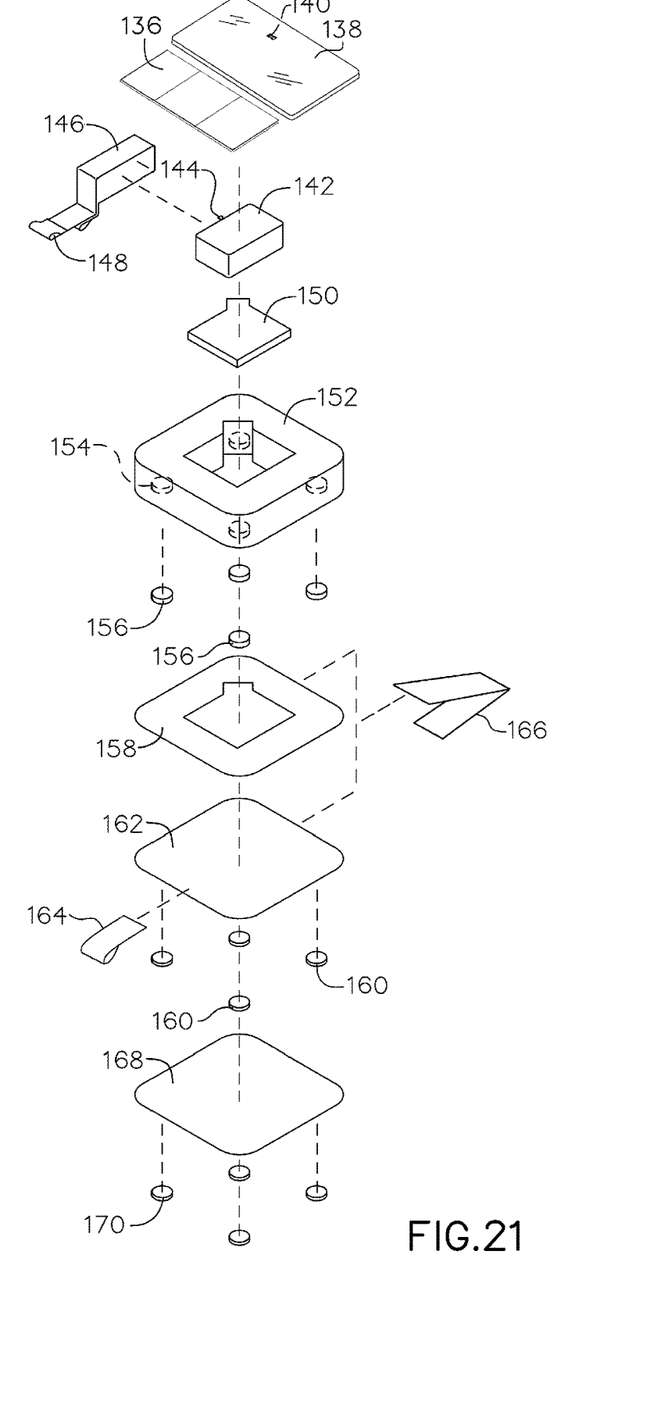
FIG. 21 conceptually illustrates an exploded view of the freely attachable solar rechargeable safety beacon device shown in FIG. 19.

Two more examples of solar rechargeable safety beacon devices which do not require landing pad configurations are shown in FIGS. 20 and 21. Specifically, FIG. 20 conceptually illustrates a section view of the freely attachable solar rechargeable safety beacon device taken along line 20-20 in FIG. 19 and FIG. 21 conceptually illustrates an exploded view of the freely attachable solar rechargeable safety beacon device shown in FIG. 19.

Persons of ordinary skill in the art may appreciate that numerous design configurations may be possible to enjoy the functional benefits of the inventive systems. Thus, given the wide variety of configurations and arrangements of embodiments of the present invention the scope of the present invention is reflected by the breadth of the claims below rather than narrowed by the embodiments described above.

I claim:

1. A freely attachable solar rechargeable safety beacon device that includes multiple modes of activation for increasing the visibility and awareness of an individual during darkness or other adverse viewing conditions and is configured to be powered by solar energy transferred between carriers, the solar rechargeable safety beacon device comprising:

a lower base plate with an inner empty area;
a compartment pad coupled to the lower base plate, said compartment pad with an inner hollow area that matches and is aligned to a shape of the inner empty area;
a solar rechargeable battery pack positioned inside the inner hollow area of the compartment pad, said solar rechargeable battery pack comprising a solar rechargeable battery;
a tethered quick release thumb tab that is exposed outside of the compartment pad at one end and wraps around the solar rechargeable battery at an opposing end when the solar rechargeable battery is placed within the inner hollow area of the compartment pad;
a screen connected to a first part of an outer exposed top side of the compartment pad and configured with a plurality of activation functions, said screen configured to be powered by the solar rechargeable battery; and
a solar panel connected to a second part of the outer exposed top side of the compartment pad and configured to capture energy from light and to convert the energy to DC electricity for charging the solar rechargeable battery.

2. The freely attachable solar rechargeable safety beacon device of claim 1, wherein the solar rechargeable safety beacon further comprises a power inverter that changes direct current (DC) voltage from the solar rechargeable battery to alternating current (AC) voltage.

3. The freely attachable solar rechargeable safety beacon device of claim 2, wherein the solar rechargeable battery back further comprises a battery pack plug that connects the solar rechargeable battery to the power inverter.

4. The freely attachable solar rechargeable safety beacon device of claim 3, wherein the power inverter changes direct current (DC) voltage from the solar rechargeable battery to alternating current (AC) voltage to power the solar rechargeable safety beacon device.

5. The freely attachable solar rechargeable safety beacon device of claim 1, wherein the solar rechargeable safety beacon further comprises a lower compartment door plate that is connected to the lower base plate and is configured to swing open to allow access to the solar rechargeable battery pack and to swing shut to cover the inner hollow area of the lower base plate.

6. The freely attachable solar rechargeable safety beacon device of claim 1, wherein the compartment pad comprises a set of magnet recesses.

7. The freely attachable solar rechargeable safety beacon device of claim 6, wherein the solar rechargeable safety beacon further comprises a set of magnets that fit in the set of magnet recesses to secure the compartment pad to the lower base plate.

8. The freely attachable solar rechargeable safety beacon device of claim 1, wherein the solar rechargeable safety beacon further comprises a set of surface fasteners configured to attach the solar rechargeable safety beacon device to a movable object.

9. The freely attachable solar rechargeable safety beacon device of claim 1, wherein the screen is an LCD touch-sensitive screen comprising a plurality of interface modes and graphic imagery facing outward.

10. The freely attachable solar rechargeable safety beacon device of claim 1 further comprising a set of hook and loop fasteners that allow for attachment to an object free of a landing pad.

* * * * *